Patented Feb. 18, 1930

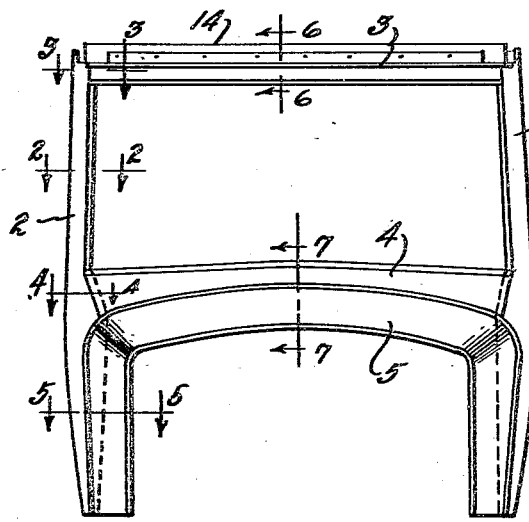

1,747,451

UNITED STATES PATENT OFFICE

WILLIAM MARSHALL, OF DETROIT, MICHIGAN, ASSIGNOR TO BRIGGS MANUFACTURING COMPANY, OF DETROIT, MICHIGAN, A CORPORATION OF MICHIGAN

VEHICLE BODY CONSTRUCTION

Application filed April 13, 1925. Serial No. 22,804.

This invention relates generally to vehicle bodies and refers more particularly to the front end construction thereof.

One of the essential objects of the invention is to provide a strong and durable front end construction in which a plurality of pre-fashioned metal parts are secured together to form an integrated unit.

Another object is to provide a construction of this type in which the windshield header and belt panel stiffen and materially reinforce the upright members or pillars.

A further object is to provide a neat and compact construction that can be manufactured at a comparatively low cost.

With the above and other objects in view the invention consists in certain novel features of construction, combinations and arrangement of parts as will be more fully described and particularly pointed out in the appended claims.

In the accompanying drawing:

Figure 1 is a front elevation of a vehicle body construction embodying my invention.

Figure 2 is a sectional view taken on the line 2—2 of Figure 1.

Figure 3 is a fragmentary sectional view taken on the line 3—3 of Figure 1.

Figure 4 is a sectional view taken on the line 4—4 of Figure 1.

Figure 5 is a fragmentary sectional view taken on the line 5—5 of Figure 1.

Figure 6 is a fragmentary sectional view taken on the line 6—6 of Figure 1.

Figure 7 is a section on the line 7—7 of Figure 1.

Referring now to the drawing, the numeral 1 designates the front end of a vehicle body of the closed type comprising the front pillars 2, windshield header 3, belt panel 4, cowl 5 and instrument board 6.

As shown, the pillars 2 are preferably constructed of light gauge sheet metal and are channel-shape in cross section. The rear walls 7 thereof preferably terminate at their inner edges with a rearwardly extending flange 8 that serves as an abutment for a suitable door (not shown) while the front walls 9 preferably terminate short of the inner edges of the rear walls 7 and are preferably provided at their inner edges with a rearwardly extending flange 10.

The header 3 is also preferably constructed of light gauge sheet metal and is substantially U-shape in cross section. As shown, the front and rear walls 12 and 13 respectively of the header are preferably secured to the top frame 14 of the vehicle body, while the bottom 15 of the header is preferably provided at its rear edge with a longitudinally extending rabbet 16 that is adapted to receive the upper edge of the windshield. To strengthen the construction, the front and rear walls 12 and 13 respectively of the channel header are preferably held spaced apart by a suitable strip 17 of the top frame and preferably extend between and are welded to the front and rear walls 7 and 9 respectively of the pillars 2. Thus, the header 3 will retain its shape and will stiffen and materially reinforce the pillars 2. It will also be noted that the upper face of the member 14 is provided at its forward edge with a substantially L-shaped rabbet 14', the base of said rabbet being substantially flush with the upper edge of the header wall 12 so that the top covering material (not shown) may be readily secured in the rabbet. As shown in Figure 7 of the drawing, the belt panel 4 is preferably channel-shape in cross section and is provided at its upper inner edge with an upstanding flange 18 which serves as an abutment for the lower edge of the windshield. This panel 4 also extends between the front and rear walls 7 and 9 respectively of the pillars and is preferably cut at an angle at the ends thereof to permit electric wires (not shown) to be dropped down the pillars for connection with suitable lights (not shown) upon the cowl. The base of the channel panel 4 is preferably welded to the front walls 9 of the pillars and is preferably provided adjacent to its opposite ends with vertical grooves 19 for receiving suitable inturned flanges 20 at the inner edges of the outer walls 9, while the upstanding flange 18 of the panel is preferably welded to the rear walls 7 of the pillars. Thus, this panel 4 also stiffens and materially reinforces the pillars 2.

To close the channels of the pillars between the header 3 and belt panel 4, I preferably provide sheet metal finish strips 21 that preferably bear against the inner face of the rear flanges 8 of the pillars and are provided at their forward edges with the longitudinally extending open return bent portions 22 that receive the rear edges of the flanges 10. Any suitable means such as the strips of moulding 23 may be employed for holding the strip 21 against the flanges 8 and concealing the joints therebetween. As shown, this moulding corresponds to the moulding shown and described in my co-pending application bearing Serial No. 8,018.

The cowl 5 may be rigidly secured by any suitable means to the lower flange 23' of the belt panel 4 and is provided at its rear edge with a depending flange 24 to which the instrument panel 6 is preferably attached. In the construction shown, the cowl is preferably clamped to the belt panel by suitable fasteners 25 which are shown in my co-pending application Serial No. 734,078, while the instrument panel 6 is preferably attached to the flange 24 by screws 26.

Thus, from the foregoing description, it will be readily apparent that the front ends of the vehicle bodies may be readily assembled at one plant and shipped as units to other plants where they may be readily assembled with other parts to form the completed bodies. Inasmuch as the header 3 and belt panel 4 are channel-shaped and extend between the front and rear walls of the pillars 2, it will also be apparent that the pillars as well as the construction as a whole, will be materially reinforced.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What I claim as my invention is:

1. A front end construction for vehicle bodies including in combination, a pair of channel-shaped pillars, a windshield header extending between and secured to the walls of the channel pillars, a channel shaped belt panel extending between and secured to the walls of the channel pillars, and removable finish strips closing the channels of the pillars between said header and panel.

2. A front end construction for vehicle bodies including in combination, a pair of door pillars, a windshield header extending between and secured to portions of said pillars, a channel-shaped belt panel extending between and secured to portions of said pillars and having a depending flange, a cowl secured to a wall of the channel belt panel, and an instrument board secured to said flange.

3. In a front end construction for vehicle bodies, the combination with an inwardly opening channel-shaped door pillar having flanges projecting rearwardly from the inner edges of the sides of the channel, of a removable finish strip engaging one of said flanges and having an open return bent portion receiving the edge of the other flange.

4. The combination with a channel-shaped door pillar having a flange projecting laterally from the rear wall thereof and a flange projecting laterally from the front wall thereof, of a finish strip bearing against the first mentioned flange and having a portion embracing the second mentioned flange, and means carried by the first mentioned flange detachably holding said finish strip in position.

5. In a front end construction for vehicle bodies, the combination with a pair of laterally spaced channel-shaped pillars arranged with their channels opening inwardly, and a connection between said pillars including a channel-shaped belt-bar having the ends thereof within the inwardly opening channels of said pillars, said bar being arranged on one side with the channel thereof opening rearwardly, the base of the channel bar being rigidly secured to the front walls of said pillars, the rear longitudinal edge portions of said channel bar having vertically extending flanges rigidly secured to the rear walls of said pillars.

6. In combination, a top frame cross member, and an upwardly opening channel-shaped windshield header, the rear wall of said header terminating short of the front wall thereof and having a rearwardly extending substantially horizontally disposed flange, the front face of said cross member being secured to the front wall of said header and the lower face of said member resting upon said flange and being provided with a longitudinally extending depending strip portion, said strip portion fitting between the front and rear walls of said channel header.

7. In combination, a top frame cross member, and an upwardly opening channel-shaped windshield header, the rear wall of said header terminating short of the front wall and having a rearwardly extending substantially horizontally disposed flange, the front face of said cross member being secured to the front wall of said header and the lower face of said member resting upon said flange, the upper face of said cross member having a substantially L-shaped rabbet at its forward end, the base of said rabbet being substantially flush with the upper edge of the front header wall.

8. In a front end construction for vehicle bodies, the combination with a pair of laterally spaced channel-shaped pillars having inturned flanges at the inner edges of the outer walls thereof, and a connection between said pillars including a channel-shaped belt-bar provided with vertical grooves for receiving said inturned flanges.

9. A front end construction for vehicle bodies including in combination, a pair of channel shaped pillars having the channels thereof opening inwardly toward each other, a windshield header extending between said pillars at the upper ends thereof and having channel shaped end portions disposed within and bridging the channels of said pillars, the sides of said channel end portions being rigidly secured to the sides of the channels of said pillars, a belt panel extending between said pillars at a point midway of their ends and having channel shaped end portions disposed in and bridging the channels of said pillars, the side walls of said last mentioned channel portions being at substantially right-angles but rigidly secured to and strengthening and reinforcing the side walls of said channel pillars, and detachable finish strips extending longitudinally of and closing the channels of said pillars between said header and panel.

10. A front end frame for vehicle bodies composed of channel shaped members and including a pair of laterally spaced pillars having the channels thereof opening inwardly toward each other, and two vertically spaced cross members extending between and secured in the channels of said pillars, one of said cross members being on edge and having the channel thereof opening rearwardly whereby the base of the said channel is substantially parallel to the forward walls of said pillar and serves as a belt panel.

In testimony whereof I affix my signature.

WILLIAM MARSHALL.